United States Patent
Missud

[15] 3,656,459
[45] Apr. 18, 1972

[54] EXCREMENT RECEPTACLE DEVICE FOR ANIMALS

[72] Inventor: Louis Missud, 61-15 43rd Avenue, Woodside, N.Y. 11377

[22] Filed: Mar. 30, 1970

[21] Appl. No.: 23,798

[52] U.S. Cl. ............................................................. 119/95
[51] Int. Cl. .......................................................A01k 23/00
[58] Field of Search ............................ 119/95, 109; 128/295

[56] References Cited

UNITED STATES PATENTS

| | | | |
|---|---|---|---|
| 2,585,251 | 2/1952 | Kahlert | 119/95 |
| 718,915 | 1/1903 | Cooper | 119/95 |
| 2,173,356 | 9/1939 | Cross | 119/95 |

*Primary Examiner*—Aldrich F. Medbery
*Attorney*—Posnack, Roberts & Cohen

[57] ABSTRACT

An animal excrement receptacle device with a disposable portion. A flexible resilient conduit tube is adapted to be held at the anal region, and below the tail, of an animal, a flexible bag or collector being attached to and extending rearwardly from the bag, the front of the tube supporting a combination pad and closure member which is attached to the front of the bag. The pad is of soft deformable material and is provided with a drawstring for compactly contracting it and bringing it and the attached portion of the bag into a closure position within the tube. The tube itself is detachably secured to a harness, the tube together with the bag being disposable. The upper and side portions of the conduit tube are adapted to flex with the movement of the animal's tail and body; but when the tail is raised in the act of defecation, the resilient tube assumes its full undistorted shape, thereby providing a passageway of maximum proportions for the feces.

12 Claims, 15 Drawing Figures

INVENTOR.
LOUIS MISSUD
BY
Pozmack, Roberts + Cohen
ATTORNEY

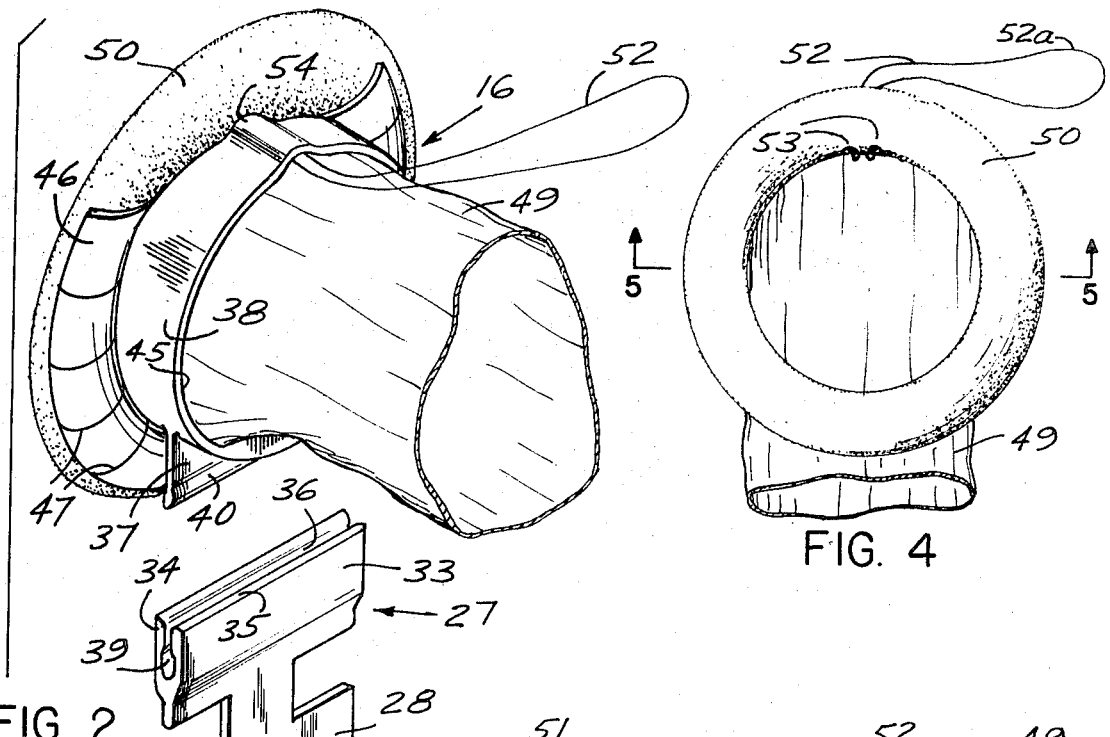
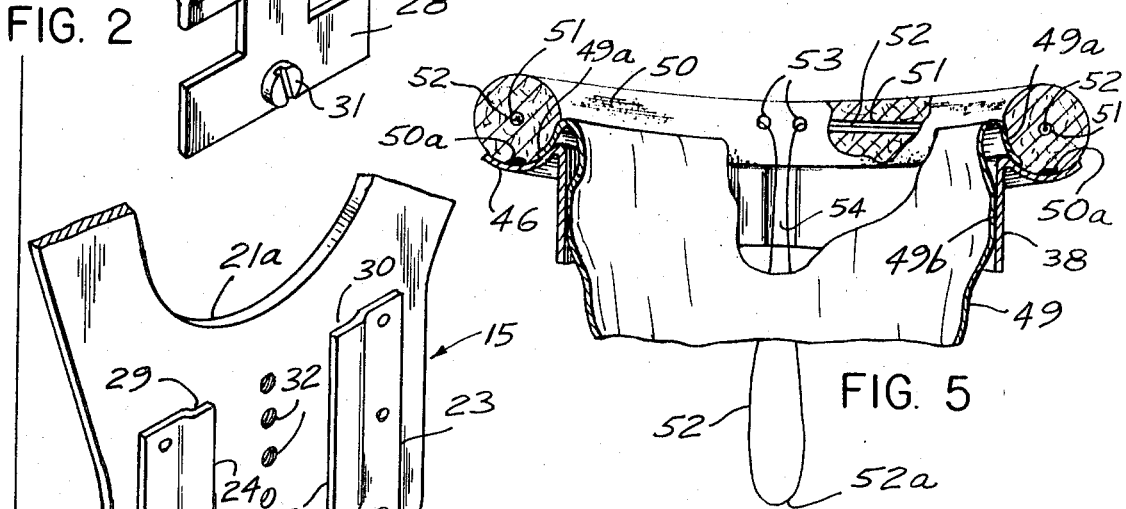
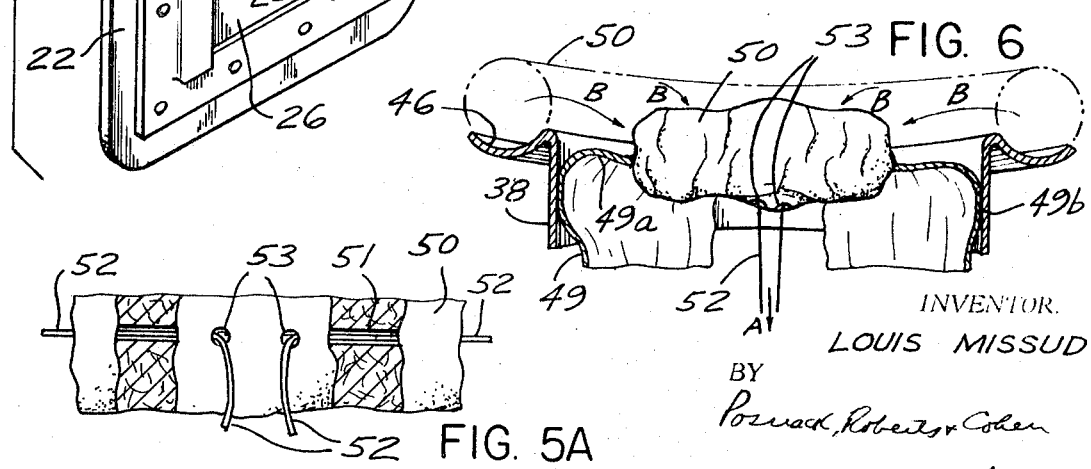

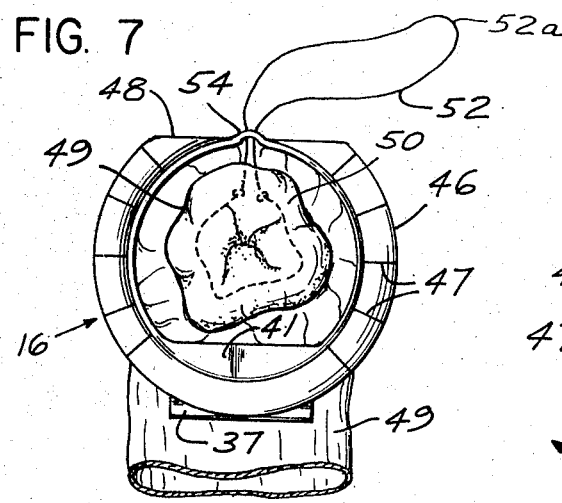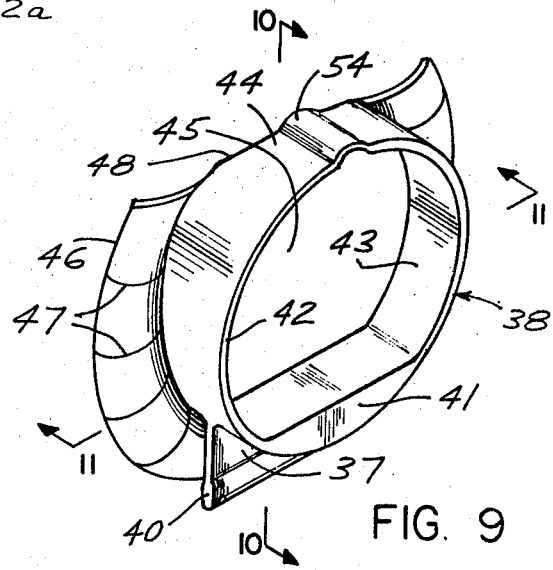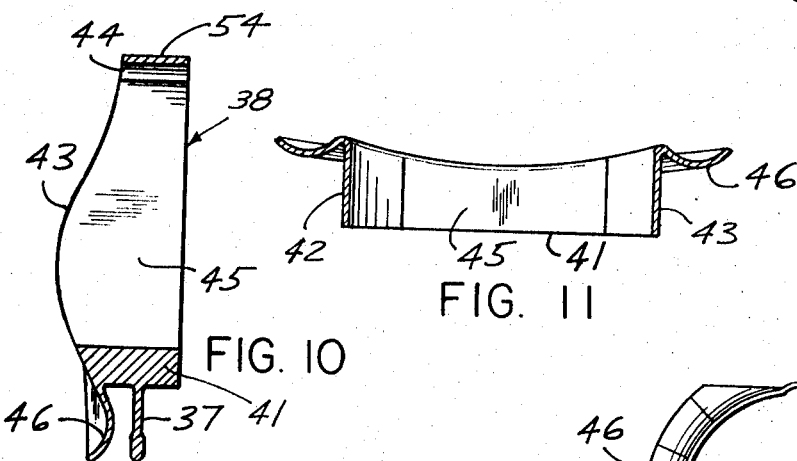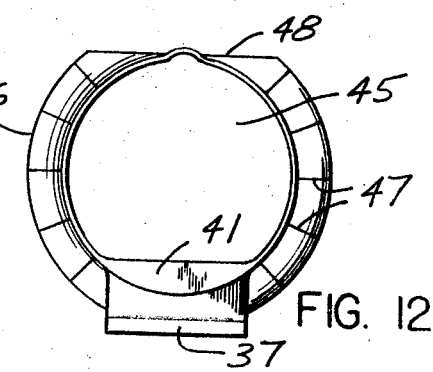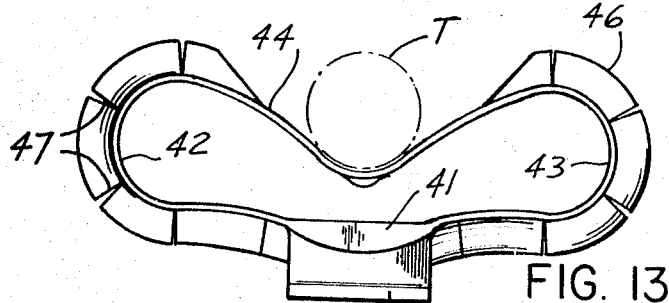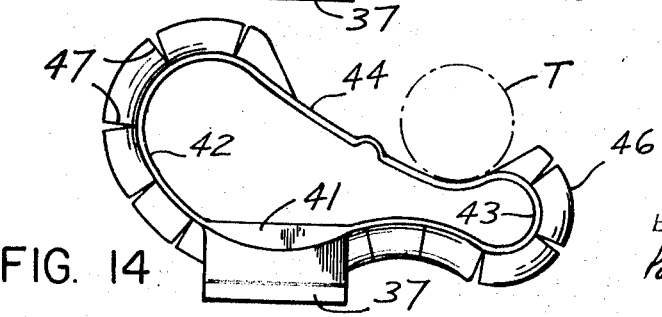

3,656,459

EXCREMENT RECEPTACLE DEVICE FOR ANIMALS

BACKGROUND OF THE INVENTION

1. The Field of the Invention

This invention relates to disposable excrement receptacle devices for animals, and is particularly directed to a device of this category adapted for removable attachment to a harness member embracing the body of a dog, cat or horse.

2. The Known Art

The known devices of this class for receiving the feces of animals, while capable of serving their intended function of collecting the excrement, are generally cumbersome and uncomfortable, and interfere with the bodily movements of the animal — particularly with the natural movement of the tail. Moreover, many of these devices are not sanitary and are odoriforous both while attached to the animal and after removal.

OBJECTS OF THE INVENTION

The main objective of this invention is to provide a practical device of this category having none of the shortcomings above mentioned. More specifically, among the objects are the provision of an excrement collecting device for animals (a) having a disposable receptacle member readily attachable to and removable from the body of the animal; (b) positionable against against the anal region of the animal for directly receiving the feces; (c) having a resilient flexible excrement conduit tube adapted for positioning adjacent the body and below the animal's tail, said tube being normally in a fully open position so as to provide a passageway of maximum proportions when the tail of the animal is in its naturally raised position during the act of defecation, but being yieldable and partially collapsible with the lowering or side movement of the tail and the twisting, wiggling and bending movements of the body; (d) having a flexible container positioned in non-interfering relation to the animal; (e) provided with padding means engageable with the rear of the animal; (f) having closure means at the rear of said conduit tube manipulable into an operative closing position; and (g) including a harness member for operatively supporting the disposable portion of the device.

Other objects, features and advantages will appear from the drawings and the description hereinafter given.

SUMMARY OF THE INVENTION

In the illustrated embodiment of this invention there is a permanent harness member and removably attached thereto a disposable receptacle member. The harness member yieldably embraces the body portion of the animal and has a rear portion below the animal's tail adjustably supporting a hinge-latch element. The disposable member has a short conduit tube with thin, resilient top and side walls, the base of said tube being relatively thick and being provided with a latch element releasably engageable with said first-mentioned latch element, said tube having at the foremost portion thereof a peripheral flange of concave cross-section supporting a ring-like pad of soft, deformable material for yieldable engagement with the animal's body portion about the anal region. A flexible bag or container is attached to and extends rearwardly from said tube. The said pad, which is attached to the forward periphery of the bag, has a drawstring extending therethrough and exteriorly for manual grasping, whereby upon a rearward operative pull of the string the said deformable pad will be contracted into a compact mass and drawn, together with the foremost portion of the bag, into said tube, the pad now serving as a closure member to seal the bag. The assembly of tube, bag and pad, being separable from the harness member, is readily disposable, the harness member being adapted to receive a new disposable receptacle member.

The portion of the tube above the base, being thin and flexible, will flex with the movement of the animal's tail and body, but when not flexed — such as when the animal's tail is raised during the act of defecation — will assume its full undistorted shape, whereby a passageway of maximum proportions for the movement of the feces is provided.

DESCRIPTION OF THE DRAWINGS

FIG. 2 is an exploded perspective view of the disposable receptacle member (a fragment of the bag being removed), the lower rear portion of the harness and the interconnecting hinge-latch element.

FIG. 4 is a fragmentary front view of the receptacle member of FIG. 3.

FIG. 5 is an enlarged fragmentary section of FIG. 4 taken along line 5—5.

FIG. 5A is a fragmentary enlarged view of the upper portion of FIG. 5.

FIG. 6 is a view substantially like FIG. 5 but showing the deformable pad and attached portion of the bag drawn into the conduit tube in a closure position, the dot-dash lines indicating the position of the pad before being drawn inwardly.

FIG. 7 is a front view of the device with the pad in its closure position as indicated in FIG. 6.

FIG. 9 is a perspective view of the conduit tube of this invention in its fully open position.

FIG. 10 is a vertical section of FIG. 9 taken along line 10—10.

FIG. 11 is a horizontal section of FIG. 9 taken along line 11—11.

FIG. 12 is a rear view of the conduit tube of FIG. 9 shown in its fully open position.

FIG. 13 is a view of the tube of FIG. 12 shown in a downwardly flexed position under the action of the animal's tail shown in dot-dash lines.

FIG. 14 is a view of the tube of FIG. 12 shown in a laterally flexed position under the action of the tail shown in dot-dash lines.

DESCRIPTION OF PREFERRED EMBODIMENT

Figure 8:
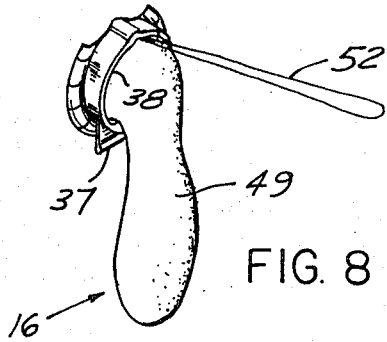
FIG. 8 is a perspective view of the disposable receptacle member in the condition shown in FIGS. 6 and 7 and after being separated from the harness.
Figure 3:
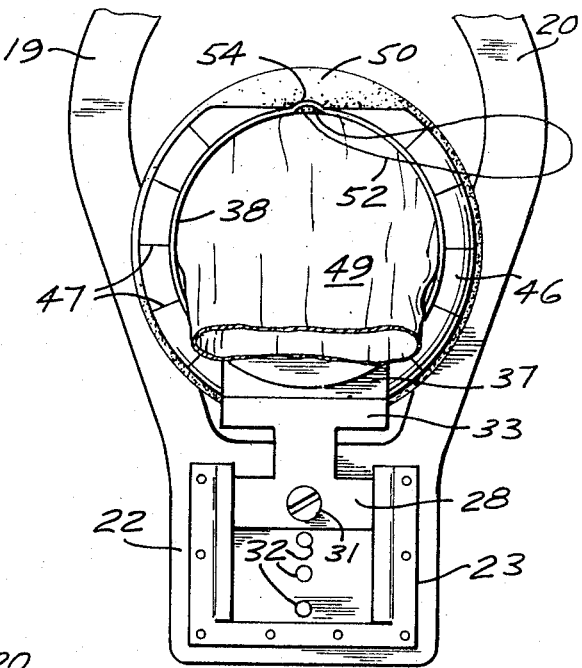
FIG. 3 is a fragmentary rear elevational view of the assembled device, the conduit tube being shown in its uncollapsed fully open position.

In the preferred embodiment illustrated in the drawings, there are two main members, the permanent saddle member generally designated 15, and the disposable receptacle member generally designated 16.

Figure 1:
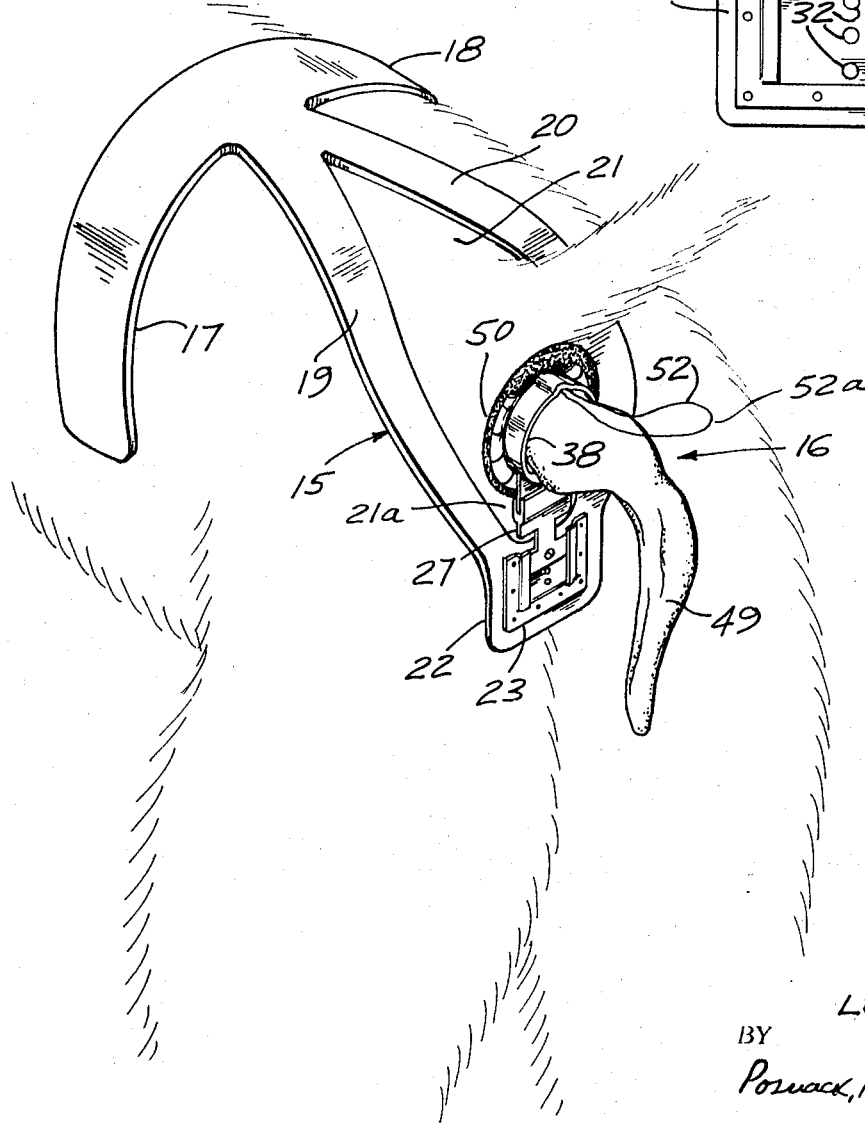
FIG. 1 is a perspective view of the excrement receptacle device according to an embodiment of this invention shown operatively applied to a dog.

The said saddle member, adapted for placement upon the body of an animal, such as the dog shown in FIG. 1, and serving as a holding member for the disposable member, comprises the laterally opposite resilient arms 17 and 18 adapted to yieldably and snugly embrace the body of the animal, the laterally separated intermediate branches 19 and 20 defining therebetween an aperture 21 proportioned and positioned to permit the tail of the animal to extend rearwardly therethrough and the rear anchoring portion 22 for operatively supporting the said disposable member 16. The said anchoring portion 22 has thereon the bracket 23 with laterally opposite wall sections 24 and 25 spaced rearwardly from the bottom wall 26 of said anchoring portion 22 to provide a socket for slidably receiving the hinge-latch element 27 which is adapted for detachable supporting connection with a portion of the said receptacle member 16, as will more clearly hereinafter appear.

The said hinge-latch element 27 is, in the particular form illustrated, a substantially flat piece with a base 28 adapted to be slidably positioned within the socket formed by the said wall sections 24 and 25, that is, within the spaces 29 and 30 between said respective wall sections 24, 25 and the said wall 26. The said base 28 supports a screw fastener 31 adapted for threaded engagement with any selected one of the threaded holes 32 in said wall 26, whereby said hinge-latch element 27 may be adjustably positioned with respect to the position of the anal region of the animal supporting this device. The upper portion 33 of said latch-element 27 has two upwardly extending spaced walls 34 and 35, forming a passageway 36 therebetween and open at the top, said walls 34 and 35 being preferably of resilient material and proportioned for yieldable engagement with the latch-element 37 extending downwardly from the conduit tube 38 to be later described.

In the illustrated embodiment, the said passageway 36 contains an enlarged portion 39 at the base thereof, adapted for yieldable locking engagement with the enlarged portion 40 at the base of said latch-element 37 of the conduit tube 38. The arrangement is hence such that the said upper portion 33 of the latch-element 27 is of bifurcated construction and is detachably connected to the said latch element 37 of the disposable receptacle member 16. It is further to be noted that the bottom portion 21a of the apertured portion 21 of the harness extends below the anal region of the animal, whereby the said disposable receptacle member 16 may be operatively positioned between the tail of the animal and the said anchoring portion 22 of the harness member 15.

The said disposable receptacle member 16 includes the said conduit tube 38 preferably made of resilient material, the base 41 of said tube being of substantial thickness, the portion of the tube thereabove comprising laterally opposite said wall portions 42 and 43 and the top portion 44 made of relatively thin, flexible resilient material whereby such upper portion may be deformed by downward or lateral pressure, as illustrated in FIGS. 13 and 14. Normally, when in its undistorted position, the said tube 38 presents a passageway 45 of maximum transverse proportions, as illustrated in FIGS. 2, 9 and 12; but when the tube is operatively bent by the action of the tail or body of the animal and the thin wall portions of the tube flexed, the said passageway will be distorted as shown in FIGS. 13 and 14 — all in a manner to be hereinbelow more fully described.

The said conduit tube 38 contains at the forward portion thereof the peripheral flange 46 of transverse concave cross-section, the concave surface being disposed forwardly. There are a plurality of slits 47 extending inwardly from the outer periphery of the flange to permit an operative yielding of said flange when the conduit tube is distorted, the flange sections defined by said slits being separable upon such distortion, as shown in FIGS. 13 and 14. The upper flanged portion of said conduit tube 38 is relatively flat, forming a section 48 positioned below the tail of the animal, whereby the tube 38 and the pad 50 (to be later described) are in non-interfering relation with the tail of the animal. The said latch element 37 extends downwardly from said thickened base 41 of the tube, thereby providing a firm connection for said latch element 37 and the coactive latch element 27. It will be noted that the rounded thickened portion 40 of the latch element 37 and the enlarged rounded portion 39 of the passageway 36 of the coacting latch element 27 are parallel, thereby providing a hinged connection, the latch element 27 thus serving its function as a hinge-latch.

The said disposable receptacle member 16 also includes, as a feces collector, the flexible bag or container 49 extending rearwardly from within the said conduit tube 38, the foremost peripheral portion 49a of said bag overlapping a part of the said peripheral flange 46 (FIG. 5). The said bag 49 is adhesively secured at 49b to the inner portion of the tube 38. Mounted upon said peripheral flange 46 is the ring-like pad 50 made of soft deformable material and being firmly adhesively secured to the said peripheral portion 49a of said bag 49, and also temporarily attached, by a few glue spots 50a, to the said peripheral flange 46. Extending through the body of the pad 50 is the passageway 51 through which extends the drawstring 52, the outer loop 52a thereof extending outwardly and being adapted for manual manipulation. In the embodiment illustrated, the said pad 50 contains at an inner portion thereof the two adjacent apertures 53 communicating with said passageway 51, the said drawstring 52 extending outwardly from said apertured portions 53 and rearwardly and outwardly through the raised channel 54 at the top of said conduit tube 38. As can be seen from FIGS. 1 to 5, and 7, said loop extends rearwardly into an exterior position where it is adapted for manual grasping.

FIG. 1 illustrates the operative parts of the device of this invention applied to an animal. It will be seen that the said soft pad 50 is in engagement with the rear of the animal at the portion surrounding the anal region, whereby irritating engagement of the device with the body of the animal is obviated. The bag 49 gravitationally extends downwardly.

Due to the fact that the side and upper wall portions 42, 43 and 44 of the conduit tube 38 are of thin resilient material, there is practically no impediment to the downward or lateral movements of the tail or to the body movements of the rear portion of the animal. FIG. 13 illustrates the downward compressibility of the tube upon the lowered position of the tail T; and FIG. 14 illustrates a laterally shifted position of the tube by the action of the tail T as it moves to a laterally lowered position. The pad 50, made, as aforesaid, of soft deformable material, will also yield with the above-mentioned movements of the tail and body. Hence, there is practically no resistance to the natural movements of the tail and body portion of the animal during its ordinary activities. When, however, the tail T is raised in the act of defecation, as shown in FIG. 1, the conduit tube 38 and the pad 50 assume their normal positions, the passageway 45 within the conduit tube being fully open and permitting the passage of the feces therethrough into the bag 49.

Before removing the said disposable portion 16, the drawstring 52 is pulled rearwardly, separating the pad 50 from its light attachment to the flange 46 and drawing it into the tube, to the position illustrated in FIGS. 6 and 7. More specifically, a pull of the drawstring in the direction of arrow A causes the pad 50 to move inwardly and forwardly in the direction of arrows B (FIG. 6) carrying with it the rearmost peripheral portion 49a of the bag 49. The pull on the drawstring compactly contracts the pad 50, causing the pad to bunch together to form a rear closure of the bag 49. The bag containing the feces is thus now fully closed. The device is then detached from the harness portion by separating the interconnected latch elements 27 and 37, whereafter the entire disposable member 16 is discarded. The harness member 15 is now ready to receive a new disposable receptacle member 16.

It is thus apparent from the above description that this invention presents a relatively simple device that may be readily attached to an animal such as a dog, without any discomfiture and without preventing the normal activities of the animal, and yet which will adequately serve its intended feces-collecting purpose. And because of the dual padding and closure function served by the pad 50, this device constitutes a non-odoriferous and sanitary unit.

In the above description, the invention has been disclosed merely by way of example and in preferred manner; but obviously many variations and modifications may be made therein. It is to be understood, therefore, that the invention is not limited to any particular form or manner of practicing same.

I claim:

1. An excrement receptacle device for an animal comprising: a harness for support of the device of an animal, a hollow conduit tube having forward and rearward portions and constructed of a material which provides a normal self-sustaining shape for said tube in which an open tubular passageway is formed in the tube extending from the said forward to the said rearward portion of the tube, means on said harness for supporting said conduit tube in a fixed operative position in which the said forward portion of the tube is adjacent the anal region of the animal and entirely below the tail thereof, a flexible container, means attaching the flexible container to the conduit tube such that the flexible container extends from the said rearward portion of the tube and is in communication with the interior of the tube, said conduit tube including an upper portion made of flexible resilient material for yieldably collapsing when contacted by the animal's tail and resuming its original normal shape when the animal's tail is raised in the act of defecating to provide said open passageway in the tube to the container.

2. A device as claimed in claim 1 wherein said tube includes a lower portion having substantially greater rigidity than said upper portion.

3. A device as claimed in claim 1 comprising means on the forward portion of the tube for engaging the the area surrounding the anal region of the anamil when said tube is in said operative position.

4. An excrement receptacle device for an animal according to claim 1, said conduit tube having a thickened base portion and a relatively thin, resilient and flexible tubular upper portion, whereby said upper portion will be adapted for flexing downwardly toward said base and laterally in opposite directions.

5. An excrement receptacle device for an animal according to claim 4, said container being made of flexible material and extending rearwardly from and being supported by said tube and being closed at the rearmost end, and closure means attached to the forward portion of said container, said closure means being movable between an inoperative to an operative closure position with respect to said container.

6. An excrement receptacle device for an animal according to claim 4, the foremost portion of said tube having a peripheral flange and an annular pad of soft deformable material positioned upon and supported in an exterior position by said flange, said pad being proportioned and positioned for engaging the area surrounding the anal region of the animal when said conduit tube is in its said operative position.

7. An excrement receptacle device for an animal according to claim 6, said peripheral flange being substantially concave in cross-section, whereby it forms a depressed seat for said annular pad.

8. An excrement receptacle device for an animal according to claim 6, said container being made of flexible material and being attached to and extending rearwardly from said tube, said pad being attached to the forward peripheral portion of said container, said pad being movable from its position on said flange to a closure position within said tube, means attached to said pad for operatively moving it from said position on said flange to its said closure position, said pad being deformable into a closure position proportioned for fitting within said tube.

9. An excrement receptacle device for an animal according to claim 8, said means attached to said pad comprising a drawstring within the body thereof and extending rearwardly therefrom through said tube and outwardly therefrom for manual grasping, whereby a rearward operative pull on said string will operatively move said pad into said tube and contract it into said closure position.

10. An excrement receptacle device for an animal, comprising a conduit tube, holding means for supporting the forward portion of said tube in an operative position in adjacent relation to the anal region of the animal and below the tail thereof, a container attached to said tube and in communication with the interior thereof, a combination deformable pad and tube closure member of ring-like configuration positioned at the front of said tube along an outer peripheral portion thereof, said container being made of flexible material and being attached to and extending rearwardly from said tube, said pad being attached to the forward peripheral portion of said container, said member being movable from said outer portion to an inner portion of the tube, means attached to said member and extending outwardly from said tube for operatively moving said member from the said outer peripheral portion to said inner portion of the tube, said member being deformable into a contracted closure position when operatively within said tube.

11. An excrement receptacle device for an animal according to claim 10, the foremost portion of said tube having a peripheral flange, said combination member being positioned upon and supported by said flange, said means attached to said combination member comprising a drawstring extending through the body of said member and rearwardly along the interior of said tube and having an outwardly extending portion for manual grasping, whereby a rearward operative pull on said string will contract said member and move it to its said inner closure position.

12. An excrement receptacle device for an animal according to claim 11, said flexible container being attached to the inner wall of said tube and having the foremost peripheral portion thereof overlapping a portion of said peripheral flange and in underlying engagement with and secured to said ring-like combination member, whereby both said member and the attached peripheral portion of said container will together be drawn into said tube upon an operative pull of said drawstring.

* * * * *